Nov. 25, 1924. 1,516,733
P. JARAY
RUDDER INDICATOR FOR AIRCRAFT
Filed July 18, 1924
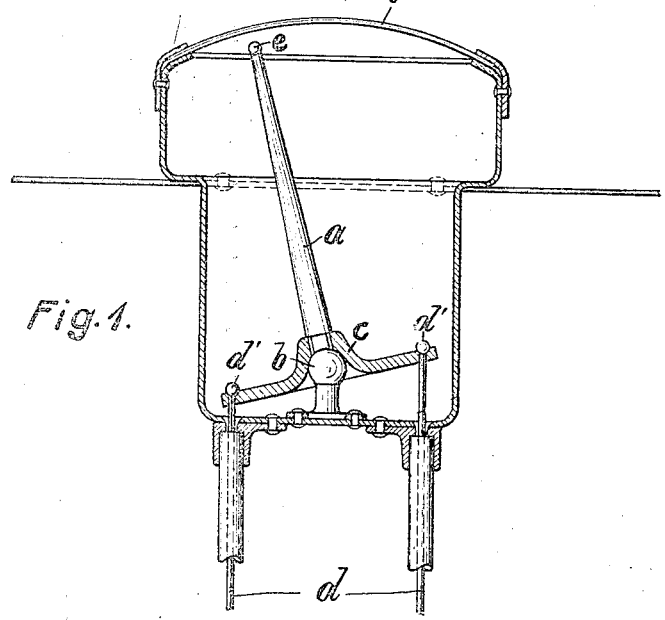
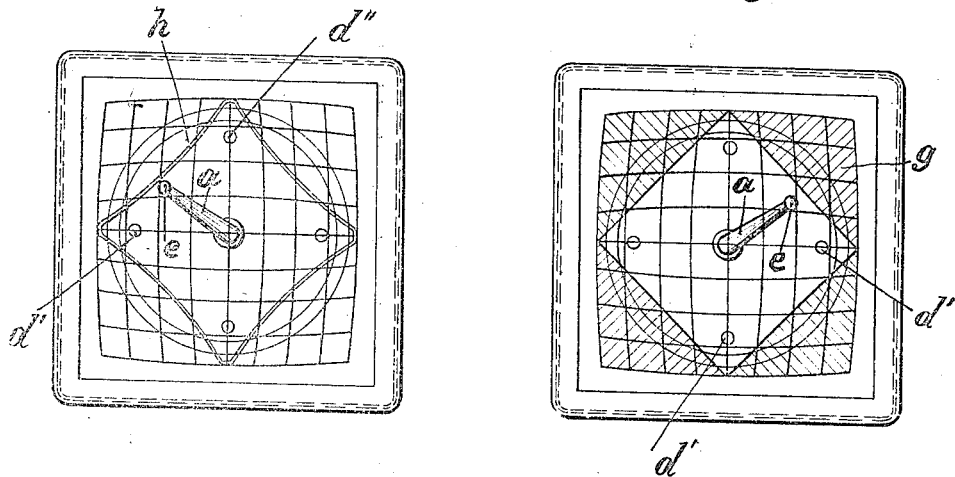
Inventor:
Paul Jaray.

Patented Nov. 25, 1924.

1,516,733

UNITED STATES PATENT OFFICE.

PAUL JARAY, OF BRUNNEN, SWITZERLAND, ASSIGNOR TO LUFTSCHIFFBAU ZEPPELIN GESELLSCHAFT MIT BESCHRANKTER HAFTUNG.

RUDDER INDICATOR FOR AIRCRAFT.

Application filed July 18, 1924. Serial No. 726,853.

*To all whom it may concern:*

Be it known that I, PAUL JARAY, a citizen of Austria, and a resident of Brunnen, Switzerland, have invented certain new and useful Improvements in Rudder Indicators for Aircraft, of which the following is a specification.

My invention relates to aircraft and more especially to an instrument which indicates the position of the rudder and the elevator at the same time. It is absolutely necessary for the pilot or the man at the wheel to know the angle of the rudder or elevator of his craft and as they generally cannot observe those planes from their position, an indicator has to transmit this knowledge to them. By my invention I provide a single device which will indicate the positions of both the rudder and the elevator and will permit the operator to ascertain that the angles of both planes are not surpassing the limit set to them for inclination at the same time. I will describe an instrument embodying my invention and then point out the novel features in claims.

In the accompanying drawing, Fig. 1 is a cross-section of an indicator embodying my invention; Fig. 2 is a view on the scale partly broken up of the instrument embodying my invention; Fig. 3 is a like view but with slight modification, also embodying my invention.

Referring to the drawing, $a$ designates a rod in rigid connection with a disc $c$, this being movably mounted on a ball $b$. At the point $d'$ the two wires $d$ coming from the rudder are fastened to the disc $c$. In the same way the wires coming from the elevator are fastened to the disc $c$ at the points $d''$. At the points $d''$ it is to be noted that in the present example a line drawn between the two points $d'$ will intersect a similar line between the two points $d''$ at right angles and that the point of intersection will be at the centre of the pivot $c$. This is the proper arrangement when the rudder and elevator are so arranged that when they are in neutral position they are at right angles to each other. On the other hand, if a different arrangement of the rudder and elevator obtains, when both are in neutral position, then a corresponding change should be made in the relative position of the points $d'$ and $d''$. Thus the knob $e$ at the end of rod $a$ will move on a convex curved plane. The casing of the instrument has a corresponding convex curved transparent cover $f$. On this a scale $g$ is drawn with crossing lines indicating the degrees of inclination of rudder and elevator.

It may become dangerous to the aircraft if both rudder and elevator have a large angle of inclination at the same time. To point out such angles that should be avoided, part of the scale may be painted in a special color as shown in the corners of the scale given in Fig. 2. Furthermore, an electric contact $h$ (in Fig. 3) may be arranged by which an electric current will be closed as soon as knob $e$ touches it, whereby an alarm—light or bell—may be made to operate.

I want it understood that I do not limit myself to the example described and shown in the drawing, as many variations will be apparent to those familiar with the art.

What I claim is:

1. An aircraft having a rudder and an elevator and an instrument for indicating the inclination of both rudder and elevator at the same time, comprising a pivoted rod and means connecting said rod with both the elevator and the rudder, so that the free end of said rod will indicate the inclination from neutral position of both the rudder and the elevator.

2. An aircraft having a rudder and an elevator and an instrument for indicating the inclination of both rudder and elevator at the same time, comprising a pivoted rod; means for connecting said rod with both the elevator and the rudder, so that the free end of said rod will indicate the inclination from neutral position of both the rudder and the elevator, and a scale adapted to point out the degrees of inclination.

In testimony whereof I affix my signature in presence of two witnesses.

PAUL JARAY.

Witnesses:
JAMES J. MURPHY, Jr.,
PHYLLIS ZUND.